(12) United States Patent
Shinagawa et al.

(10) Patent No.: US 7,985,788 B2
(45) Date of Patent: Jul. 26, 2011

(54) FLAME RETARDANT RESIN COMPOSITION AND MOLDED ARTICLE THEREOF

(75) Inventors: Hiroshi Shinagawa, Yokohama (JP); Sumire Kubota, Kawasaki (JP); Atsushi Fuseya, Tokyo (JP); Katsuhiro Matsuda, Kawasaki (JP); Kenji Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/916,974

(22) Filed: Nov. 1, 2010

(65) Prior Publication Data
US 2011/0130498 A1    Jun. 2, 2011

(30) Foreign Application Priority Data

Nov. 27, 2009  (JP) ................. 2009-270826

(51) Int. Cl.
*C08K 5/5399* (2006.01)
(52) U.S. Cl. ................... 524/122; 524/138
(58) Field of Classification Search ............ 524/122, 524/138
See application file for complete search history.

(56) References Cited

U.S. PATENT DOCUMENTS

| 2007/0232742 A1 | 10/2007 | Maehara |
| 2009/0018264 A1 | 1/2009 | Fuseya |

FOREIGN PATENT DOCUMENTS

| JP | 2007-270011 A | 10/2007 |
| JP | 2008-075068 A | 4/2008 |

*Primary Examiner* — Peter Szekely
(74) *Attorney, Agent, or Firm* — Fitzpatrick, Cella, Harper & Scinto

(57) ABSTRACT

The invention provides a flame retardant resin composition containing a polyalkylene furan dicarboxylate represented by the following formula (1), an aromatic polycarbonate, a phosphazene compound represented by the following formula (2) and a fluorine-containing compound:

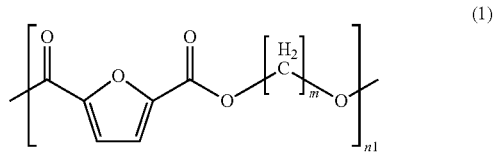

wherein m and $n_1$ are each an integer of 2 or more;

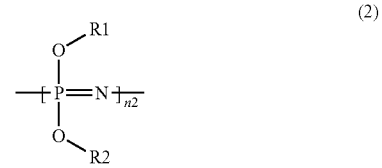

wherein $n_2$ is an integer of 2 or more, and R1 and R2 are each an alkyl group having 1 to 20 carbon atoms or an aryl group.

5 Claims, No Drawings

FLAME RETARDANT RESIN COMPOSITION AND MOLDED ARTICLE THEREOF

BACKGROUND OF THE INVENTION

1. Field of the Invention

The present invention relates to a flame retardant resin composition excellent in both impact resistance and flame retardancy and a molded article thereof.

2. Description of the Related Art

In recent years, attention has been attracted to resins made from renewable biomass from the point of view of environmental protection.

Polyalkylene-2,5-furan dicarboxylate (hereinafter referred to as PAF), which is a furan resin, is a thermoplastic resin synthesizable from a saccharide and is a biomass resin expected to be applied to electrical machinery and apparatus. However, PAF is low in physical properties such as impact resistance and flame retardancy by itself, and so its usable applications are limited.

In order to improve these properties, in Japanese Patent Application Laid-Open No. 2007-270011, flame retardancy is improved by adding a lamellar silicic acid salt subjected to an organizing treatment and an anti-dripping agent to polybutylene-2,5-furan dicarboxylate (hereinafter referred to as PBF) that is a PAF. However, its impact resistance is low, and there has been a demand for improvement in impact resistance when it has been intended to be used in electric and electronic machinery and apparatus.

On the other hand, in Japanese Patent Application Laid-Open No. 2008-075068, impact resistance is improved by adding an impact modifier and a lamellar clay mineral agent to PAF. However, there has been a demand for improvements in impact resistance and flame retardancy when it has been intended to be used in electric and electronic machinery and apparatus.

SUMMARY OF THE INVENTION

As described above, attention has been attracted to PAF as a biomass resin, and its improvements in impact resistance and flame retardancy have been attempted. However, there has been no example where practically acceptable impact resistance and flame retardancy are achieved. In addition, when a rubber component is compounded into PAF, its impact resistance is improved. However, it has been difficult to impart high flame retardancy (UL-94 Class: 5V) to a resin composition obtained by compounding the rubber component into PAF even when a flame retardant has been added.

Further, it has also been considered to mix an aromatic polycarbonate into PAF. However, the impact resistance of PAF has not been improved by such mixing because the compatibility of PAF with the aromatic polycarbonate resin is poor, and a difference in viscosity between both components is great.

The present inventors have found that a resin having high-level impact resistance and flame retardancy that have been difficult to be achieved in the conventional PAF compositions is obtained by compounding a phosphazene compound and a fluorine-containing compound into a mixed resin of PAF and an aromatic polycarbonate, thus leading to completion of the present invention.

According to the present invention, there is provided a flame retardant resin composition comprising a polyalkylene furan dicarboxylate represented by the following formula (1), an aromatic polycarbonate, a phosphazene compound represented by the following formula (2) and a fluorine-containing compound:

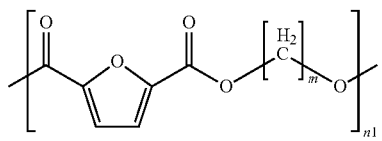

wherein m and $n_1$ are each an integer of 2 or more;

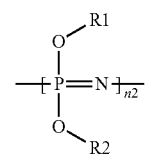

wherein $n_2$ is an integer of 2 or more, and R1 and R2 are each an alkyl group having 1 to 20 carbon atoms or an aryl group.

According to the present invention, there is also provided a molded article formed of the above-described flame retardant resin composition.

The flame retardant resin composition according to the present invention is low in environmental load and has high impact resistance and flame retardancy and can thus be used in electric and electronic machinery and apparatus parts, automobile parts and building parts making good use of these properties.

Further features of the present invention will become apparent from the following description of exemplary embodiments.

DESCRIPTION OF THE EMBODIMENTS

Preferred embodiments of the present invention will now be described in detail. Incidentally, individually disclosed embodiments are examples of the flame retardant resin composition and molded article according to the present invention, and the present invention is thus not limited thereto. The flame retardant resin composition according to the present invention contains PAF, an aromatic polycarbonate, a phosphazene compound and a fluorine-containing compound. The present invention will hereinafter be described in detail.

PAF used in the present invention is a polyalkylene furan dicarboxylate represented by the following formula (1):

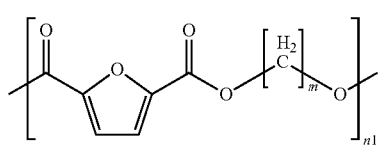

wherein m and $n_1$ are each an integer of 2 or more.

In the formula (1), m is favorably an integer of to 4, and most favorably 2 (i.e., polyethylene furan dicarboxylate (PEF)).

No particular limitation is imposed on the molecular weight and molecular weight distribution of PAF used in the present invention so far as the flame retardant resin composition containing PAF according to the present invention can be subjected to a molding process. However, the number average molecular weight of PAF as measured by gel permeation chromatography is favorably 15,000 or more and 300,000 or less, more favorably 50,000 or more and 200,000 or less. In the flame retardant resin composition according to the present invention, other copolymer components may be mixed into the repeating unit of the formula (1) so far as the mechanical properties, thermal properties and flame retardancy of the resin composition are not deteriorated, and PAF may be crosslinked with a crosslinking agent.

The aromatic polycarbonate used in the present invention is an aromatic polycarbonate such as an aromatic homopolycarbonate or copolycarbonate obtained by a reaction of an aromatic dihydric phenol compound and phosgene or carbonic diester.

As the aromatic dihydric phenol compound, may be used 2,2-bis(4-hydroxyphenyl)propane, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-diphenyl)butane, 2,2-bis(4-hydroxy-3,5-diethylphenyl)propane, 2,2-bis(4-hydroxy-3,5-diethylphenyl)propane, 1,1-bis(4-hydroxyphenyl)cyclohexane or 1-phenyl-1,1-bis(4-hydroxyphenyl)ethane, and these compounds may be used either singly or in any combination thereof.

No particular limitation is imposed on the molecular weight of the aromatic polycarbonate so far as the resulting flame retardant resin composition can be subjected to a molding process. However, the weight average molecular weight thereof as measured by gel permeation chromatography is favorably 20,000 or more and 500,000 or less, more favorably 50,000 or more and 300,000 or less. If the molecular weight is too low, the impact resistance of the resulting flame retardant resin composition becomes low. Specific examples of the aromatic polycarbonate include PANLITE K-1300Y (trade name, product of TEIJIN CHEMICALS LTD.). The mass ratio of PAF to the aromatic polycarbonate is favorably from 5/95 to 40/60. If the ratio of PAF exceeds 40, it is difficult to achieve good flame retardancy in a resulting flame retardant resin composition. If the ratio of PAF is less than 5, it is difficult to achieve the effect to reduce environmental load in a resulting flame retardant resin composition because the ratio of the biomass resin is low. When PAF and the aromatic polycarbonate are mixed at a ratio within the above-described range, properties balanced between the ratio of the biomass resin and flame retardancy can be achieved.

The phosphazene compound used in the present invention is represented by the following formula (2):

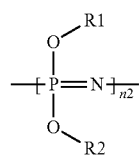

(2)

wherein $n_2$ is an integer of 2 or more, and R1 and R2 are each an alkyl group having 1 to 20 carbon atoms or an aryl group.

No particular limitation is imposed on R1 and R2 in the formula (2). However, each of them is favorably an aryl group. In addition, R1 and R2 may be the same. Further, a crosslinked structure may be formed between polymer chains by copolymerization or addition of a crosslinkable component so far as the mechanical properties, thermal properties and flame retardancy of a resulting flame retardant resin composition are not deteriorated. Specifically, SPS-100 (trade name, product of Otsuka Chemical Co., Ltd.) or Rabitle FP110 (trade name, product of FUSHIMI Pharmaceutical Co., Ltd.) may be used. In the formula (2), $n_2$ is favorably an integer of 3 to 25.

The content of the phosphazene compound is desirably 10 to 40 parts by weight, more favorably 10 to 25 parts by weight per 100 parts by weight of PAF and the aromatic polycarbonate in total. If the content of the phosphazene compound is less than 10 parts by weight, it is difficult to achieve sufficient flame retardancy in a resulting flame retardant resin composition. If the content exceeds 40 parts by weight, the impact resistance of the resin composition is deteriorated. In the present invention, 2 or more phosphazene compounds may be used in combination so far as the mechanical properties, thermal properties and flame retardancy of a resulting flame retardant resin composition are not deteriorated.

No particular limitation is imposed on the kind of a silicone/acrylic core-shell rubber used in the present invention. However, the shell portion favorably has high affinity for PAF and the aromatic polycarbonate or forms a chemical bond with them. Specifically, METABLEN S-2200 (trade name, product of Mitsubishi Rayon Co., Ltd.) may be used. 2 or more kinds of silicone/acrylic core-shell rubbers may be used in combination so far as the mechanical properties, thermal properties and flame retardancy of a resulting flame retardant resin composition are not deteriorated.

No particular limitation is imposed on the content of the silicone/acrylic core-shell rubber. However, the content of the silicone/acrylic core-shell rubber is favorably 5 to 40 parts by weight, more favorably 5 to 15 parts by weight per 100 parts by weight of PAF and the aromatic polycarbonate in total. If the content of the silicone/acrylic core-shell rubber is less than 5 parts by weight, it is difficult to achieve the effect to improve impact resistance in the resulting flame retardant resin composition. If the content exceeds 40 parts by weight, the flame retardancy of the resin composition is deteriorated.

No particular limitation is imposed on the kind of the fluorine-containing compound used in the present invention. However, polytetrafluoroethylene (hereinafter referred to as PTFE), PTFE modified with another resin or a PTFE-containing mixture is favorable because of good handling and dispersibility. Particularly, PTFE modified with another resin is favorably used. Specifically, METABLEN A-3800 (trade name, product of Mitsubishi Rayon Co., Ltd.) that is an acrylic resin-modified PTFE may be used.

No particular limitation is imposed on the content of the fluorine-containing compound in the present invention. However, the content of PTFE is favorably less than 0.5 parts by weight per 100 parts by weight of the whole flame retardant resin composition taking influence on environment into consideration. Accordingly, in case of, for example, METABLEN A-3800 which contains 50 parts by weight of PTFE in 100 parts by weight thereof, A-3800 may be added up to 1 part by weight per 100 parts by weight of the whole flame retardant resin composition.

The flame retardant resin composition according to the present invention may further contain a pigment, a heat stabilizer, an antioxidant, an inorganic filler, plant fiber, a weathering agent, a lubricant, a parting agent and an antistatic agent so far as the properties thereof are not greatly impaired.

A molded article formed of the flame retardant resin composition according to the present invention may be provided as having a desired shape. No particular limitation is imposed on a molding method. However, for example, extrusion and injection molding may be used. Favorable use examples of the molded article according to the present invention include casings and internal parts of copying machines, casings and internal parts of printers, toner cartridge parts of copying machines and laser beam printers, casings and internal parts of facsimiles, camera parts, casings and internal parts of personal computers, and casings and internal parts of televisions.

EXAMPLES

The present invention will hereinafter be described in detail by the following Examples. However, the present invention is not limited by these examples.

Synthesis of polyethylene-2,5-furan dicarboxylate

A 10-L SUS-made separable flask equipped with a nitrogen inlet tube, a fractionating-cooling column and an SUS-made agitating blade were provided. This separable flask was charged with 2,300 g (14.7 mol) of 2,5-furan dicarboxylic acid and 2,758 g (44.2 mol) of ethylene glycol, and then charged with 4.2 g (12.3 mmol) of titanium butoxide and 4.1 g (19.6 mmol) of monobutyltin oxide as catalysts.

Agitation was started while introducing nitrogen, and at the same time, a power source of a mantle heater was turned on to heat the contents to 150° C. At the time the internal temperature reached 150° C., outflowing of the by-product water attending on a condensation reaction started. When the reaction was continued for 1 hour at internal temperatures of 160° C. and 165° C. each, for 0.5 hours at 170° C. and 175° C. each, and for 2 hours at 210° C., the contents became transparent. At the time the outflowing of water distilled became weaker, the reaction system was connected to a vacuum pump to reduce the pressure of the reaction system up to the fully vacuumed condition (133 Pa or less) in about 2 hours. The vacuum was released once with nitrogen, and 2.1 g (6.2 mmol) of titanium butoxide and 2.1 g (10.1 mmol) of monobutyltin oxide were added. Thereafter, the pressure was reduced again up to the fully vacuumed condition (133 Pa or less) in about 30 minutes. Thereafter, the reaction was continued for 14 hours under the reduced pressure. Polyethylene-2,5-furan dicarboxylate (hereinafter referred to as PEF) obtained in this manner had a number average molecular weight of about 63,000 as measured by gel permeation chromatography. The thus-obtained resin was ground into pellets and used in the following Examples and Comparative Examples.

Examples 1 to 3, and Comparative Examples 1 to 5

PEF obtained by the above-described process was vacuum-dried for 6 hours at 120° C. Pellets of an aromatic polycarbonate resin were hot-air-dried for 6 hours at 120° C. The above-described PEF and aromatic polycarbonate resin, and compounding additives shown in Table 1 or 2 were weighed so as to give a mass ratio shown in Table 1 or 2 and mixed. Thereafter, the resultant mixture was melted and kneaded at a cylinder temperature of 215° C. to 230° C. by a twin-screw extruder (Laboplast Mill, trade name, manufactured by Toyo Seiki Seisakusho Co., Ltd.). The resin extruded from the tip of the extruder was cut into pellets. The resultant pellets were vacuum-dried for 6 hours at 90° C. and then molded into a multipurpose test specimen (80 mm×10 mm×t (thickness)=4 mm) and a specimen (125 mm×12.5 mm×t 2 mm) for flame retardant tests at a cylinder temperature of 210° C. to 235° C. and a mold temperature of 50° C. by means of an injection molding machine (SE18DU, trade name, manufactured by Sumitomo Heavy Industries, Ltd.).

Examples 4 and 5

A multipurpose test specimen and a specimen for flame retardant tests were molded from the resin in the same manner as in Examples 1 to 3 except that the cylinder temperature upon melting and kneading was changed to 240° C. to 245° C., and the cylinder temperature upon molding was changed to 260° C. to 310° C.

Comparative Examples 6 to 9

A multipurpose test specimen and a specimen for flame retardant test were molded from the resin in the same manner as in Examples 1 to 3 except that the cylinder temperature upon melting and kneading was changed to 200° C. to 210° C., the cylinder temperature upon molding was changed to 200° C. to 215° C., and the mold temperature was changed to 25° C.

The respective materials used and shown in Table 1 or 2 are as follows:
  Aromatic polycarbonate: "PANLITE K-1300Y" (trade name, product of TEIJIN CHEMICALS LTD.)
  Phosphazene compound: "SPS-100" (trade name, product of Otsuka Chemical Co., Ltd.)
  Phosphazene compound: "FP110" (trade name, product of FUSHIME Pharmaceutical Co., Ltd.)
  Phosphorus-containing flame retardant: "PX-200" (product of DAIHACHI CHEMICAL INDUSTRY CO., LTD.)
  Silicone/acrylic core-shell rubber: "METABLEN S-2200" (trade name, product of Mitsubishi Rayon Co., Ltd.)
  Fluorine-containing compound: "METABLEN A-3800 (trade name, product of Mitsubishi Rayon Co., Ltd.)
  Processing stabilizer: "IRGANOX B220" (trade name, product of Ciba Japan K.K.
  Processing stabilizer: "IRGANOX 1010" (trade name, product of Ciba Japan K.K.

Incidentally, evaluation was carried out as to the following items.
(1) Flame Retardancy
Testing method: V test (20 mm vertical burning test) and 5V test (125 mm vertical burning test) according to UL 94 Standard.
Sample shape: Specimen (125 mm×12.5 mm×t=2 mm) for flame retardant tests.
(2) Charpy Impact Strength
Testing method: According to JIS K 7111.
Sample shape: A multipurpose test specimen (80 mm×100 mm×t=4 mm).
Notching: Using a notching tool A-3 (trade name, manufactured by Toyo Seiki Seisakusho Co., Ltd.). type-A notch.
Measuring device: Digital impact tester DG-UB (trade name, manufactured by Toyo Seiki Seisakusho Co., Ltd.).
(3) Deflection Temperature Under Load
Testing method: According to JIS K 7191-2
Sample shape: A multipurpose test specimen (80 mm×100 mm×t=4 mm).
Placing method: Flatwise.
Flexure stress: 1.80 MPa.
Distance between supports: 64 mm.
Heating rate: 120° C./h.
Heating medium: Silicone oil.
Measuring device: HDT/VSPT tester TM-4126 (trade name, manufactured by Ueshima Seisakusho Co., Ltd.).

(4) Flexural Strength and Flexural Modulus
Testing method: According to JIS K 7171.
Sample shape: A multipurpose test specimen (80 mm×100 mm×t=4 mm).
Measuring device: Autograph AG-IS (trade name, manufactured by Shimadzu Corporation).

Compounding ratios and measured results of flame retardancy (results of 5V test and V test), Charpy impact strength, deflection temperature under load, flexural strength and flexural modulus in Examples 1 to 5 and Comparative Examples 1 to 9 are shown in Table 1 or 2. As apparent from Table 1, when the phosphazene compound and the fluorine-containing compound were compounded into PAF and the aromatic polycarbonate, the result that the 5V test was passed and the Charpy impact strength was 5 kJ/m$^2$ or more were obtained.

On the other hand, as apparent from Table 2, when the aromatic polycarbonate or the phosphazene compound was not compounded, a phosphorus-containing flame retardant was compounded in place of the phosphazene compound, or the fluorine-containing compound was not compounded, the result that the 5V test was not passed or that the Charpy impact strength did not reach 5 kJ/m$^2$ though the 5V test was passed was obtained.

As apparent from Examples 1 to 5, when the weight ratio of PAF to the aromatic polycarbonate was controlled to from 5/95 to 40/60, the flame retardancy could be improved.

TABLE 1

|  |  |  | Ex. 1 | Ex. 2 | Ex. 3 | Ex. 4 | Ex. 5 |
|---|---|---|---|---|---|---|---|
| Resin (parts by weight) | PAF | PEF | 36 | 36 | 40 | 5 | 5 |
|  | Aromatic polycarbonate | K-1300Y | 64 | 64 | 60 | 95 | 95 |
| Compounding additive (parts by weight) | Phosphazene compound | SPS-100 | 22 | 22 | 22 | 10 | — |
|  |  | FP110 | — | — | — | — | 10 |
|  | Phosphorus-containing flame retardant | PX-200 | — | — | — | — | — |
|  | Fluorine-containing compound | A-3800 | 1.4 | 1.4 | 1.4 | 0.3 | 0.3 |
|  | Silicone/acrylic core-shell rubber | S-2200 | 14 | 14 | 14 | 5 | 5 |
|  | Processing stabilizer | IRGANOX B220 | — | 0.3 | 0.3 | 0.3 | 0.3 |
|  |  | IRGANOX 1010 | — | — | — | — | — |
| Test results | 5V test (2.0 mm thick) |  | Passed | Passed | Passed | Passed | Passed |
|  | V test (2.0 mm thick) |  | V-0 | V-0 | V-1 | V-0 | V-0 |
|  | Charpy impact strength (kJ/m$^2$) |  | 7.3 | 6.4 | 5.3 | 68.6 | 70.2 |
|  | Deflection temperature under load (° C., 1.8 MPa) |  | 74 | 73 | 71 | 103 | 103 |
|  | Flexural strength (MPa) |  | 72 | 72 | 73 | 82 | 82 |
|  | Flexural modulus (MPa) |  | 2154 | 2172 | 2225 | 2135 | 2150 |

TABLE 2

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|---|
| Resin (parts by weight) | PAF | PEF | 35 | 33 | 35 | 38 | 50 | 100 | 100 | 100 | 100 |
|  | Aromatic polycarbonate | K-1300Y | 65 | 67 | 65 | 62 | 50 | — | — | — | — |
| Compounding additive (parts by weight) | Phosphazene compound | SPS-100 | — | — | 21 | — | — | 25 | — | — | — |
|  |  | FP110 | — | — | — | — | — | — | — | — | — |
|  | Phosphorus-containing flame retardant | PX-200 | 22 | 20 | — | — | — | — | — | — | — |
|  | Fluorine-containing compound | A-3800 | 0.3 | 0.3 | — | — | 0.6 | 0.6 | 0.5 | — | — |
|  | Silicone/acrylic core-shell rubber | S-2200 | 14 | 6 | 14 | 25 | 11 | — | — | 43 | — |
|  | Processing stabilizer | IRGANOX B220 | 0.3 | — | 0.3 | 0.3 | — | — | — | — | — |
|  |  | IRGANOX 1010 | — | 0.3 | — | — | 0.2 | — | — | — | — |
| Test results | 5V test (2.0 mm thick) |  | Not passed | Passed | Not passed | Not passed | Not passed | Not passed | Not passed | Not passed | Not passed |
|  | V test (2.0 mm thick) |  | Not passed | V-0 | Not passed | Not passed | Not passed | Not passed | Not passed | Not passed | Not passed |
|  | Charpy impact strength (kJ/m$^2$) |  | 6.0 | 3.2 | 8.8 | 34.4 | 9.5 | 1.1 | 1.0 | 7.0 | 0.9 |
|  | Deflection temperature under load (° C., 1.8 MPa) |  | 70 | 72 | 73 | 81 | 82 | 67 | 72 | 63 | 73 |
|  | Flexural strength (MPa) |  | 65 | 99 | 74 | 73 | 91 | 130 | 119 | 64 | 137 |
|  | Flexural modulus (MPa) |  | 1999 | 2782 | 2188 | 1966 | 2397 | 3474 | 3629 | 1833 | 3546 |

The flame retardant resin composition according to the present invention, which is low in environmental load and has high impact resistance and flame retardancy can be used in electric and electronic machinery and apparatus parts, automobile parts and building parts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-270826, filed Nov. 27, 2009, which is hereby incorporated by reference herein in its entirety.

What is claimed is:

1. A flame retardant resin composition comprising a polyalkylene furan dicarboxylate represented by the following formula (1), an aromatic polycarbonate, a phosphazene compound represented by the following formula (2) and a fluorine-containing compound:

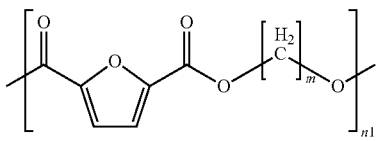 (1)

wherein m and $n_1$ are each an integer of 2 or more;

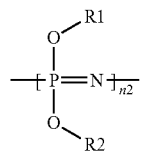 (2)

wherein $n_2$ is an integer of 2 or more, and R1 and R2 are each an alkyl group having 1 to 20 carbon atoms or an aryl group.

2. The flame retardant resin composition according to claim 1, wherein a weight ratio of the polyalkylene furan dicarboxylate and the aromatic polycarbonate is from 5/95 to 40/60.

3. The flame retardant resin composition according to claim 1, wherein a content of the phosphazene compound is 10 to 40 parts by weight per 100 parts by weight of the polyalkylene furan dicarboxylate and the aromatic polycarbonate in total.

4. The flame retardant resin composition according to claim 1, which further comprises a silicone/acrylic core-shell rubber.

5. A molded article formed of the flame retardant resin composition according to claim 1.

* * * * *